Figure 1:
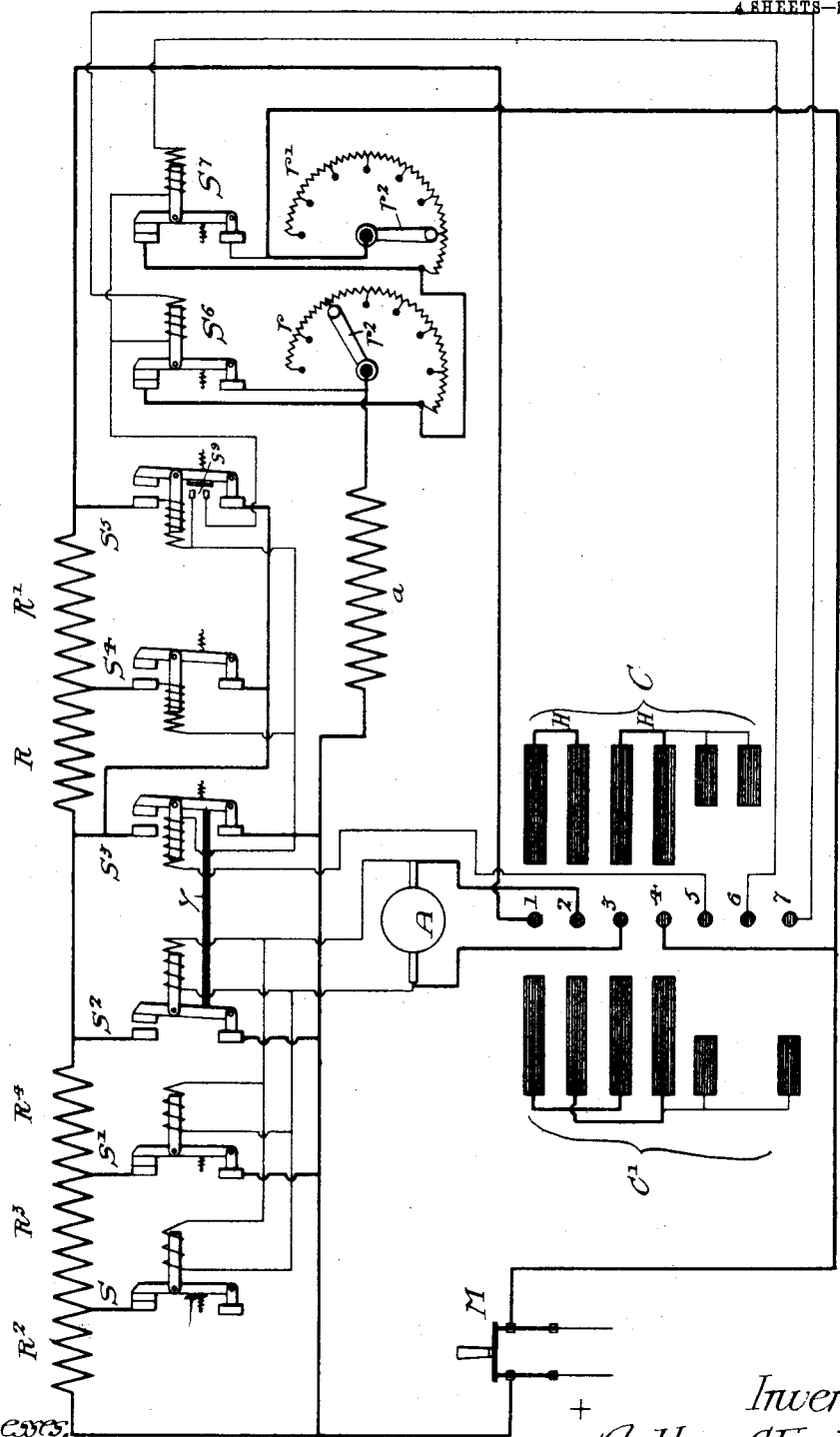

No. 791,887. PATENTED JUNE 6, 1905.
A. C. EASTWOOD.
MOTOR CONTROLLING SYSTEM.
APPLICATION FILED OCT. 24, 1904.

4 SHEETS—SHEET 1.

Witnesses:
Augustus K. Copps.
Titus N. Irons.

Inventor:
Arthur C. Eastwood,
by his Attorneys,
Howard & Howard.

No. 791,887. PATENTED JUNE 6, 1905.
A. C. EASTWOOD.
MOTOR CONTROLLING SYSTEM.
APPLICATION FILED OCT. 24, 1904.

4 SHEETS—SHEET 2.

Witnesses:
Inventor:
Arthur C. Eastwood,
by his Attorneys,

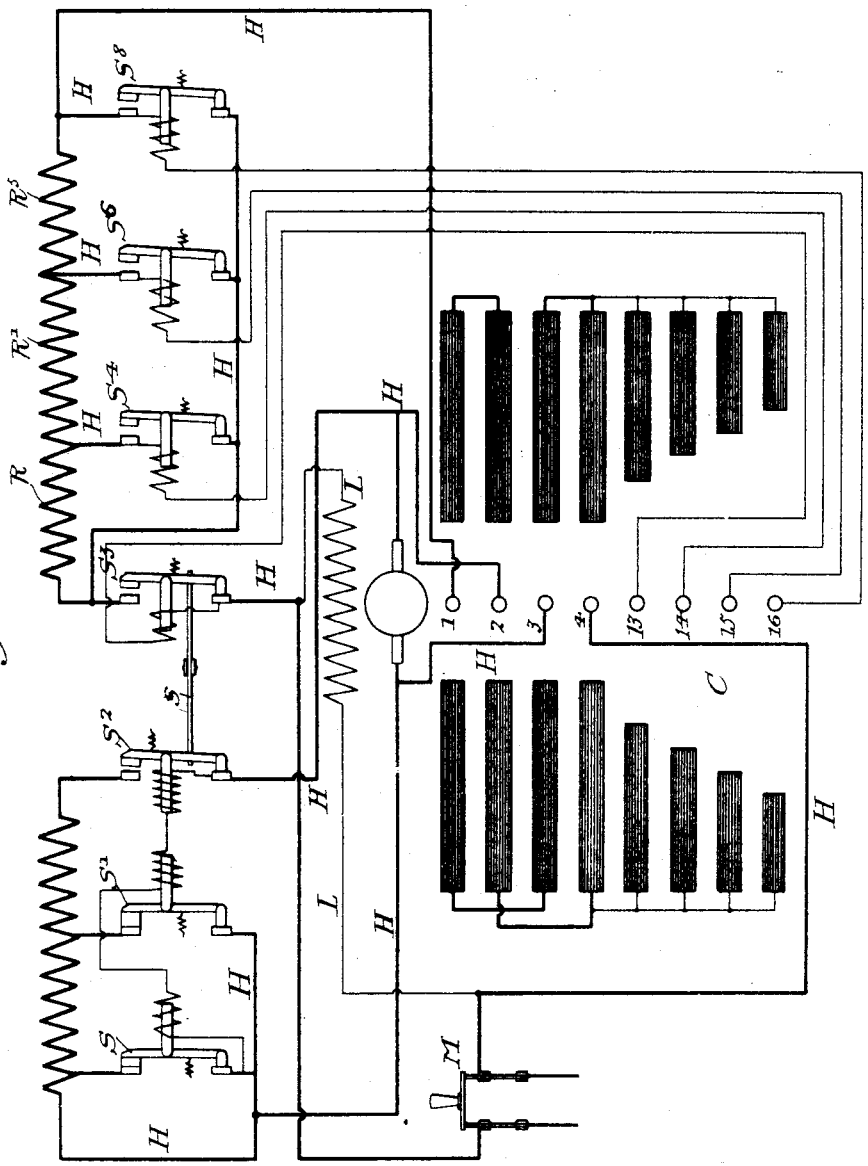

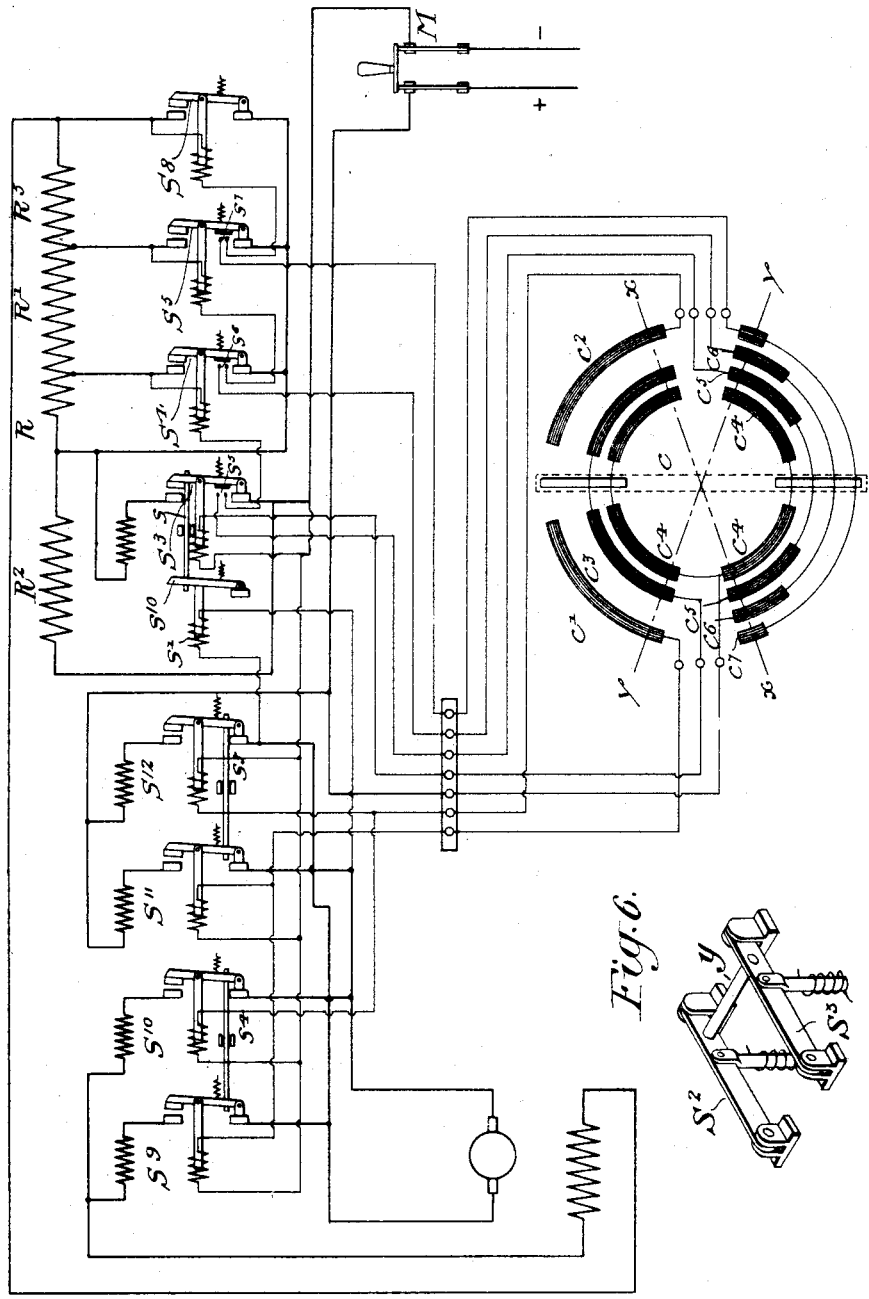

No. 791,887.      Patented June 6, 1905.

UNITED STATES PATENT OFFICE.

ARTHUR C. EASTWOOD, OF CLEVELAND, OHIO.

MOTOR-CONTROLLING SYSTEM.

SPECIFICATION forming part of Letters Patent No. 791,887, dated June 6, 1905.

Application filed October 24, 1904. Serial No. 229,335.

*To all whom it may concern:*

Be it known that I, ARTHUR C. EASTWOOD, a citizen of the United States, residing in Cleveland, Ohio, have invented certain Improvements in Motor-Controlling Systems, of which the following is a specification.

One object of my invention is to provide an improved system for controlling the operation of series reversing motors or reversing shunt or compound wound motors whose speed is varied by varying the field strength.

A further object of the invention is to provide a system whereby the armature of a motor, and consequently the mechanism attached thereto, may be reversed as rapidly as is consistent with the current-carrying capacity of the motor and the mechanical strength of the various moving parts and no more rapidly. I also desire to provide a system including apparatus which shall limit the flow of current through the motor-windings to a predetermined safe value and also to provide means whereby the flow of current shall be maintained equal or up to said value.

When an electric motor is reversed while its armature is in motion—as, for example, by reversing the connections of the armature to the source of current-supply—the counter electromotive force generated by the forward rotation of the armature is added to the applied voltage, resulting in an effective voltage higher than that of the current-supply, which tends to force current through the armature. The additional electromotive force so produced is maintained until the armature has come to rest, and when the latter starts to turn in its reverse direction the counter electromotive force generated by it is opposed to and therefore is subtractive from the applied voltage.

In the case of a compound-wound motor operating with constant field strength the voltage which would be effective in forcing current through the armature and the resistance in series with it will at the instant of reversal be almost double the line voltage, since the counter electromotive force in an efficient motor will be very nearly equal to the applied voltage. In a patent granted to me on October 11, 1904, No. 772,277, I have described and claimed a system providing an extra amount of resistance, substantially equal to the starting resistance of the motor, for limiting the current to its normal starting value when the motor is suddenly reversed. In the case of a variable-speed motor, however, the electromotive force generated by the armature at the instant of reversal of its connections to a supply-line may be very much higher than the voltage of said line. For example, considering the case of a motor operating at three hundred revolutions per minute with full field strength, it may be assumed that this will run at twelve hundred revolutions per minute with a weakened field, as might occur in the case of a series motor whose full-load speed was three hundred revolutions per minute, but which was operated at a light load. If the connections of the armature were suddenly reversed while the motor was running at full speed and at the same time the field was brought up to normal strength, the armature would in a short time generate a counter electromotive force approximately equal to four times its normal counter electromotive force. If the motor were operated on a two-hundred-and-twenty-volt circuit and its efficiency was such that its normal counter electromotive force was two hundred and ten volts, the armature at the instant of reversal would generate eight hundred and forty volts, and this plus the applied voltage of two hundred and twenty would give a voltage of ten hundred and sixty available to force current through the resistance.

If one hundred amperes be assumed as the maximum safe value of the current, a resistance of 10.6 ohms must be provided to limit said current to this amount at the instant of reversal. To maintain as nearly as possible a constant flow of one hundred amperes during the period of reversal, this resistance should be gradually reduced as the armature slows down until when the armature is at rest only 2.2 ohms should be in circuit, so as to still allow a flow of one hundred amperes at the applied voltage of two hundred and twenty. This resistance of 2.2 ohms should be then gradually cut out as the armature is accelerated in a reverse direction, and my invention is intended to provide a system whereby the resistance will be cut into and out of circuit with the motor as above described.

Figure 2:
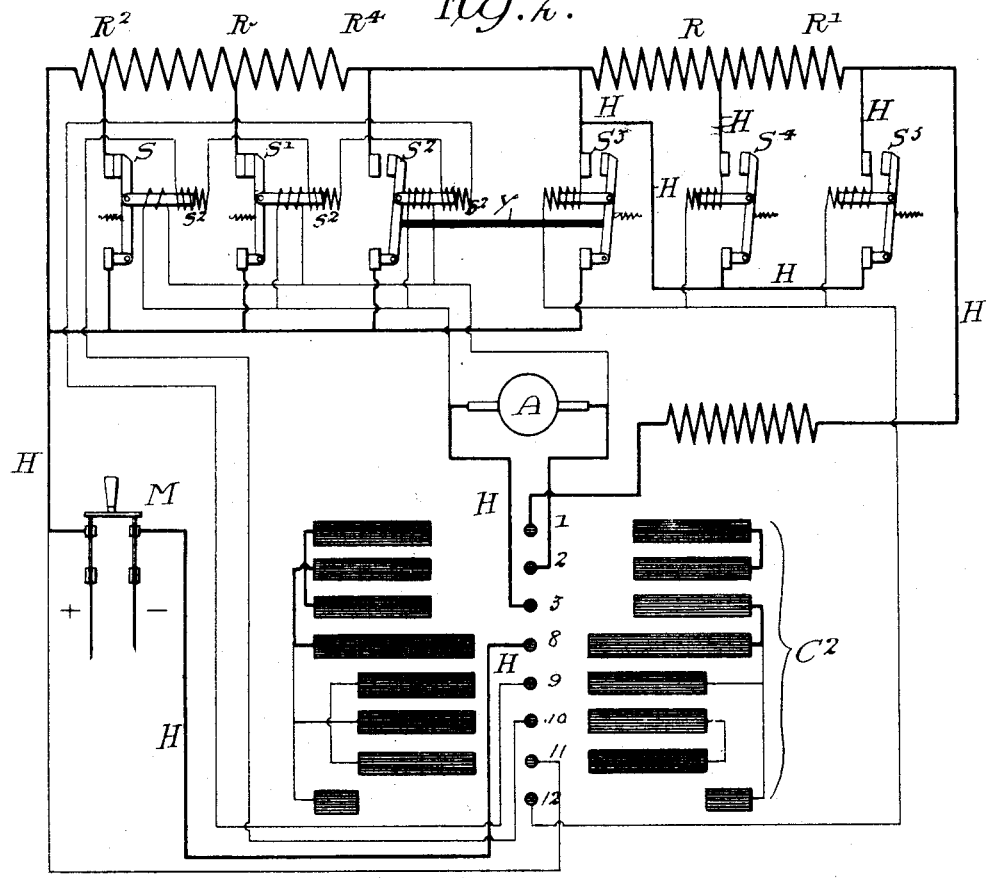
Figure 4:
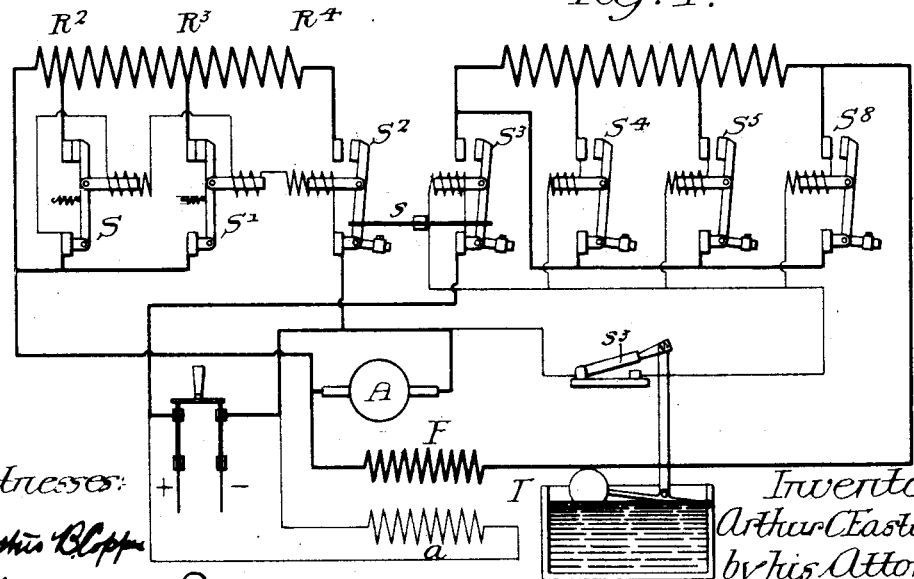

In the accompanying drawings, Figure 1 is a diagrammatic view showing my invention as applied to and operated in connection with a shunt-wound motor whose speed is varied by varying its field strength. Fig. 2 is a diagrammatic view showing my invention as applied to the operation of a series-wound motor. Fig. 3 is a diagrammatic view showing my invention as applied to the operation of a shunt-wound motor provided with a reversing-controller having four running-points. Fig. 4 shows my invention as applied to a compound-wound motor and particularly designed to bring the armature of the motor to rest in a minimum time after current has been cut off. Fig. 5 is a diagrammatic view showing my invention as applied to the operation of a series motor controlled by electromagnetic reversing-switches whose coils are supplied with current through a hand-operated controller, and Fig. 6 is an elevation illustrating one operative form of connection between the blades of two switches employed in some forms of my invention.

Referring to Fig. 1 of the above drawings, $A$ is the armature of a motor having a shunt field-winding $a$ and which is provided with a bank of starting resistance divided in two sections $R$ and $R'$. There is in addition a bank of braking resistance divided into three sections $R^2$, $R^3$, and $R^4$, which is connected in series with one terminal of the main switch $M$ and the starting resistance. In addition there are two rheostats $r$ and $r'$, each having an adjustable contact-arm $r^2$ and contact-buttons in connection with various points of bodies of resistance, as shown, whereby the amount of current flowing to the shunt-field of the motor may be varied.

A reversing-controller is provided for the motor having two series of contact-segments $C$ and $C'$ and a number of fingers, hereinafter referred to, for engagement with said segments. Respectively connected to the ends of the sections $R^2$, $R^3$, and $R^4$ are three switches $S$, $S'$, and $S^2$, normally maintained in their closed positions and provided with operating-coils all connected in multiple across the terminals of the armature $A$. In addition there are three switches $S^3$, $S^4$, and $S^5$, connected to the ends and to the point of junction of the two sections of resistance $R$ and $R'$, the coil of the first of these switches being connected at one end to a finger 5 of the reversing-controller, while its other end is connected with one end of the coils of switches $S^4$ and $S^5$ to a wire in connection with one pole of the main switch. The other ends of the coils of switches $S^4$ and $S^5$ are connected, respectively, to those switch-terminals in permanent connection with the sections $R$ and $R'$ in the manner and for the purpose set forth in my Patent No. 772,277.

The three switches $S^3$, $S^4$, and $S^5$ are so constructed as to normally remain in their open positions, while two additional switches $S^6$ and $S^7$, respectively, connected to short-circuit the rheostats $r$ and $r'$ are constructed to normally remain closed, their coils each having one end connected to a terminal of an auxiliary switch designed to be closed by the closing of switch $S^5$ and supplied with current from one pole of the main switch $M$. The second ends of these coils are respectively connected to fingers 7 and 6 of the reversing-controller. Said controller is in addition provided with fingers 1, 2, 3, and 4, and four segments in each of the groups $C$ and $C'$ are so interconnected as to reverse the connections of the armature $A$ to the supply-mains in the well-known manner.

A yoke-piece $y$ extends between the blades of switches $S^2$ and $S^3$ in such manner that both of them are necessarily in their open or closed positions at the same time.

Under operating conditions, with the main switch $M$ closed and the segments $C$ of the reversing-controller in engagement with their respective fingers, current will flow from said switch through the coil of switch $S^3$ to finger 5 of the reversing-controller, thence through two of the segments $C$ to finger 4, and so to the negative supply-main. This energization of said coil closes the switch $S^3$ and permits current to flow to the motor-armature through sections $R$ and $R'$ of the resistance. Current simultaneously flows to the field-winding $a$ from the positive side of the switch $S$, through both of the normally closed switches $S^6$ and $S^7$ and back to the negative terminal of said switch $S$. The switches $S^4$ and $S^5$ will now successively and automatically close as the motor accelerates, the closing of the latter switch closing the auxiliary switch $s^9$, thereby supplying current to the coil of switch $S^7$, current flowing from finger 6 of the controller to certain of the segments of the group $C$, through finger 4, and thence to one of the supply-mains. This energization of the coil of switch $S^7$ causes it to open, and thereby throws into series with the shunt-field $a$ a certain portion of the resistance of the rheostat $r'$, as determined by the position of its adjustable arm $r^2$. This resistance weakens the current flowing through the field, thereby causing the motor to still further speed up.

It will be seen that as soon as current is supplied to the armature $A$ the switches $S$ and $S'$ immediately open, owing to the energization of their coils by the counter electromotive force of the armature, while the switch $S^2$ tends to open, but cannot, owing to its being yoked to switch $S^3$, which is closed, so that if the reversing-controller be operated to bring its segments $C'$ into engagement with the fingers said switches $S$ and $S'$ will still be held open and switch $S^2$ will open, since said coils are still excited by said counter electromotive force. Even though the circuit through the coil of switch $S^3$ be now completed as before this switch cannot close by reason of the yoke-bar $y$, which holds it open because switch $S^2$ is open, so that current from the supply-mains is compelled to flow through the three sections of resistance $R^2$, $R^3$, and $R^4$, as well as through the two sections of starting resistance R and R', being thereby limited to a safe amount. I have shown this bar $y$ in diagram in Figs. 1 and 2, and while it may take the form of any rigid connection between the blades of adjacent switches I have shown in Fig. 6 one of such forms.

As the armature A slows down and its counter electromotive force consequently falls the switches S, S', and $S^2$ successively close, since they are adjusted to overcome the pull of their magnets at successively lower voltages, the switch S closing first, so as to short-circuit the section $R^2$, and the switch $S^2$ finally closing, so as to cut out the last portion of the braking resistance. Such deënergization of the coil of switch $S^2$, as well as the fact that the coil of switch $S^3$ is already energized from the supply-mains, causes the closing of said switch $S^3$, after which the armature will be automatically accelerated, as before, with the exception that since the finger 7 is engaged by one of the segments C', while the finger 6 is open-circuited the switch $S^6$ will be opened, thereby throwing the resistance of the rheostat $r$ into series with the shunt-field $a$. The switches S and S' will again be opened and the coil of switch $S^2$ energized by the counter electromotive force of the motor-armature, so that when the controller is again operated to reverse the motor the above-described cycle of operations will be repeated.

The two rheostats are employed, as shown, in order that, if desired, the motor may be accelerated to different speeds after successive reversals.

When it is desired to operate a series motor according to my invention, I have found it desirable to provide what I designate as "pilot-coils" for each of the switches S, S', and $S^2$, so as to insure their remaining open while the reversing-controller is being operated to move one set of segments out of engagement with the fingers and to bring the other set of segments into such engagement. Otherwise if said controller were operated slowly the counter electromotive force of the motor would fall to zero, owing to the dying down of its field. In order to overcome this objection, I provide auxiliary windings $s^2$ for each of said switches, as illustrated in Fig. 2, connecting all of these windings in series and bringing their terminals to two fingers 9 and 10 on the reversing-controller, it being noted that the pilot-winding on switch $S^2$ is so proportioned that the energization of the coil of switch $S^3$ causes both switches to close, even though said first-named coil be also energized. In order that these pilot-coils may be excited before the main circuit of the motor is closed, I form the segments engaging the fingers 9 and 10 as well as two others of the segments of both groups $C^2$ and $C^3$ so as to engage said fingers before the others, thus insuring the switches S, S', and $S^2$ being open and all of the resistance $R^2$, $R^3$, and $R^4$ in circuit when the connections of the armature to the line are reversed.

It will be seen that the segments coacting with the fingers 9, 10, and 11 while engaging said fingers as the controller is operated from its "off" position before the others of the segments are of such a length that when the controller is in its full "on" position with the motor operating in either direction said three segments are out of engagement with said fingers. With this construction it will be seen that as the segments $C^2$, for example, are moved into engagement with their respective fingers current will flow from the positive side of switch M to finger 11, thence to two of the segments $C^2$ to finger 10, then to all of the coils $s^2$, flowing from them to finger 9, through two others of the segments $C^2$ to finger 8, and so to the negative side of switch M. All of the switches S, S', and $S^2$ are therefore open, after which the engagement of three of the segments $C^2$ with fingers 1, 2, and 3 completes the circuit from the switch M through the armature A, series field F, and starting resistance R and R' up to the switch $S^3$. This is finally closed by the excitation of its coil from current supplied from the positive side of switch M flowing through all of the braking resistance and thence to the upper terminal of said switch, the end of said coil being connected to finger 12, which is engaged by a relatively short one of the segments $C^2$, in connection with the segments engaging finger 8, which, as before noted, is connected to the negative side of the switch M. The closing of switch $S^3$ starts the motor, and it will be noted that simultaneously with such starting the fingers 9, 10, and 11 pass off of their segments, while switches S, S', and $S^2$ are still maintained open, since their main coils are connected, as before noted, in multiple with the armature A.

In Fig. 3 the reversing-controller is made so as to be available for operating the motor with any number of the resistance-sections R, R', or $R^5$ continuously in circuit. In this instance the coils of the braking-switches S, S', and $S^2$ are connected in series, though, as before, they are excited by the counter electromotive force of the armature. The adjustment of each of these switches is such that as the motor-armature slows down and its counter electromotive force gradually falls the switch S will first close and then the switches S' and $S^2$ in succession. In this instance there is provided an additional switch $S^8$ for controlling the additional section of resistance $R^5$. One terminal of the actuating-coil of switch $S^3$ is connected to one pole of main switch M, while its second terminal is connected to a finger 13 on the reversing-controller. Similarly one terminal of each of the switches $S^4$, $S^6$, and $S^8$ is respectively connected to some point in the starting resistance, as set forth in my above-mentioned patent, while the second ends of said coils are respectively connected to fingers 14, 15, and 16 on the said controller. The segments for engaging the fingers 13 to 16, inclusive, are of successively-decreasing lengths, so that as the controller C is operated the finger 13 is first engaged and afterward the fingers 14 to 16 in succession. By this means if the controller be operated to its extreme position in either direction the motor will be operated as described in connection with Fig. 1, whereas if said controller be stopped so that fingers 15 and 16 are not engaged by their respective segments the motor will be accelerated until the switch $S^4$ closes, after which it will continue to run with sections of resistance $R'$ and $R^5$ in series with its armature.

Fig. 4 shows my improved system as applied to the operation of a compound-wound motor, the shunt-field being indicated at $a$ and the series field at F. As before, the coils of switches S, $S'$, and $S^2$ are connected in series, so as to be energized by the counter electromotive force of the armature, though in this instance switch $S^2$ is designed to normally remain open. The coils of switches $S^3$, $S^4$, $S^5$, and $S^8$, while each having one terminal connected, as referred to in my above-mentioned application for patent, have their second terminals all connected together and to the negative pole of the main switch M, there being, however, a controlling-switch $s^3$ interposed between them and said main switch. This controlling-switch may be operated automatically by any desired mechanism, such as the float T, and when closed will permit switches $S^3$, $S^4$, $S^5$, and $S^8$ to successively close, and so automatically accelerate the motor. After the switch $S^3$ closes the coils of switches S, $S'$, and $S^2$ are energized by the counter electromotive force of the armature A, so that the first two of them open, while the last, though tending to close, is prevented from doing so by reason of a locking-bar $s$, which prevents said switches $S^2$ and $S^3$ both being in a closed position at the same time. The opening of the controlling-switch $s^3$ open-circuits all of the coils of switches $S^3$, $S^4$, $S^5$, and $S^8$, consequently allowing these switches to open, and since the coils of switches S, $S'$, and $S^2$ are still excited by the counter electromotive force of the armature the latter of said switches closes as soon as such opening of switch $S^3$ takes place. The closing of switch $S^2$ short-circuits the armature A upon itself, though in series with the sections $R^2$, $R^3$, and $R^4$ of the resistance, and as the speed of the armature is gradually decreased switches S and $S'$ successively close until when the speed of the armature, and consequently its counter electromotive force, has fallen to zero, the switch $S^2$ opens, and the motor may be started again, as above noted.

In that application of my system shown in Fig. 5 I provide a controller $C^4$, having all of its contacts arranged as segments supported in a single plane and provided with an operating-handle $c$. The motor, which is of the series type, is provided with a reversing mechanism consisting of four switches $S^9$, $S^{10}$, $S^{11}$, and $S^{12}$, each of which is provided with a coil having one end connected to the negative supply-main. The second ends of the coils of switches $S^9$ and $S^{11}$ are connected to a segment $c'$ of the controller C, while the second end of the coils of each of the switches $S^{10}$ and $S^{12}$ is connected to segments $c^2$. A bank of starting resistance, divided in three sections R, $R'$, and $R^5$, is connected to the motor and to the supply-mains through switches $S^3$, $S^4$, $S^5$, and $S^8$, as shown in Fig. 3, there being in addition a body of braking resistance $R^2$ in shunt to the terminals of switch $S^3$. The actuating-coils of switches $S^4$, $S^5$, and $S^8$ are respectively connected to the controller C through auxiliary switches, each of which is placed to be closed by the switch which under operating conditions is actuated just before the one having the corresponding coil. In addition to the above there is a coil $s'$, connected in shunt to the armature-terminals of the motor and active upon an armature connected to a movable blade $s^{10}$. A locking-bar $s$ extends between this blade and the blade of switch $S^3$, so that as long as coil $s'$ is sufficiently energized said switch cannot close. Locking-bars $s^3$ and $s^4$ extend between the blades of switches $S^{11}$ and $S^{12}$ and $S^9$ and $S^{10}$, respectively, so that but one switch of each set can be in a closed position at the same time. One terminal of the actuating-coil of switch $S^3$ is connected to the segments $c^3$ of the controller, while segments $c^4$ are connected to one of the supply-mains through main switch M. One terminal of each of the auxiliary switches $s^5$, $s^6$, and $s^7$ is connected to segments $c^5$, $c^6$, and $c^7$ of the controller C.

With the main switch closed and the operating-handle $c$ moved as far as it will go in one direction—as, for example, the position indicated by the lines $x$ $x$—switches $S^{10}$ and $S^{12}$ of the reversing mechanism will be closed, as will also switch $S^3$. Current is thus applied to the motor, which is automatically accelerated by the successive operation of switches $S^3$, $S^5$, and $S^8$, it being noted that though coil $s'$ is excited by the counter electromotive force of the armature of the motor such excitation will not occur until after the coil of switch $S^3$ has been energized. If now the operating-handle c be moved into the position y y, the coils of switches S¹⁰, S¹², and S³ will be open-circuited, after which the coils of switches S⁹, S¹¹, and S³ will be supplied with current, so that the two former of these will immediately close. The latter switch is maintained open, since the counter electromotive force of the armature of the motor operates the blade $s^2$ as soon as the coil of switch S³ was open-circuited, thereby holding the locking-bar in such position that the blade of said switch could not close. Current from the supply-mains must, therefore, flow to the armature through the braking resistance $R^2$, as well as through the starting resistance R, R′, and $R^5$. When the counter electromotive force of the armature has fallen to zero, the coil $s'$ permits motion of the blade $s^2$, so as to allow the switch S³ to close, and the above-described cycle of operations again takes place.

I claim as my invention—

1. The combination of a motor having means for connecting it with current-supply mains and means including a bank of normally short-circuited resistance and controlling switches for automatically maintaining the flow of current through the armature of the motor above a predetermined minimum other than zero for a predetermined time after said armature has been disconnected from the supply-mains, substantially as described.

2. The combination of a motor, means for reversing the same, and means for automatically causing a step-by-step variation of the current-flow occurring between the time when current is applied after operation of the reversing means and the time the armature reverses its direction of rotation, substantially as described.

3. The combination of a motor, reversing means for the same, a body of resistance and a series of automatic switches, said switches including means whereby they are caused to successively operate to cut out said resistance between the time that the reversing means is operated and the time when the armature reverses its direction of rotation, substantially as described.

4. The combination of a motor, two bodies of resistance, automatic switches for cutting said resistance into and out of circuit with the motor, and means for reversing the motor, a plurality of said switches having operating mechanism arranged and connected to cause them to cut out of circuit one of the bodies of resistance after the motor connections are reversed and before the armature reverses its direction of rotation, substantially as described.

5. The combination of a motor, two bodies of resistance, two series of automatic switches connected to respectively short-circuit sections of their respective bodies of resistance, one of said series of switches having its actuating-coils connected to cause its switches to operate successively as the counter electromotive force of the motor rises and the other series of switches having their actuating-coils connected to cause operation of their switches as the counter electromotive force of the motor falls, substantially as described.

6. The combination of a motor, an automatic switch for connecting the motor to supply-mains, a body of resistance connected to be in series with said motor and said switch, a second automatic switch for controlling the insertion of said resistance in circuit, and means for mechanically connecting the blades of said switches so that closing or opening of one effects the closing or opening of the other, substantially as described.

7. The combination of a motor, an automatic switch for connecting the same to supply-mains, a bank of resistance, and a second automatic switch in shunt thereto, said parts being connected to be in series with the motor, and a bar between said two switches constructed to cause the operation of one of the said switches to effect operation of the other, substantially as described.

8. The combination of a motor having means connecting it with supply-mains, a body of resistance, and a series of automatic switches for cutting said resistance out of circuit, said switches having actuating-coils connected between the armature-terminals of the motor and being adjusted to operate successively as the counter electromotive force of the motor falls, substantially as described.

9. The combination of a motor having means connecting it to supply-mains, a body of resistance, and a series of automatic switches for cutting said resistance out of circuit, said switches having actuating-coils connected between the armature-terminals of the motor and being adjusted to operate successively as the counter electromotive force of the motor falls, with a reversing device and means for automatically accelerating the motor after said device and said switches have been operated, substantially as described.

10. The combination of a series motor, a body of resistance, a switch for connecting the motor to current-supply mains, a series of automatic switches connected to cut said resistance into and out of circuit with the motor, said resistance being in shunt to said first switch, each of said switches having two actuating-coils, one of which is connected across the armature-terminals of the motor and the other is provided with means whereby it may be connected to the supply-mains, substantially as described.

11. The combination of a series motor, a body of resistance, a switch in shunt thereto for connecting the motor to the current-supply mains, a series of automatic switches connected to cut said resistance into and out of circuit with the motor, each of said automatic switches having two actuating-coils, of which one is connected across the armature-terminals of the motor and the other is provided with means whereby it may be connected to the supply-mains, with a reversing-controller having means for breaking the connection between the switch-coils and the supply-mains after the motor-armature has begun to generate an electromotive force, substantially as described.

12. The combination of a series motor, a body of resistance, a switch in shunt thereto for connecting the motor to current-supply mains, a series of automatic switches connected to cut said resistance into and out of circuit with the motor, each of said switches having two actuating-coils, of which one is connected across the armature-terminals of the motor and the other is provided with means whereby it may be connected to supply-mains, with a reversing-controller having contact-fingers and segments through which said second coils of the automatic switches are connected to the supply-mains, said segments being placed to break the connections between the mains and said coils when the controller is in its full "on" position, substantially as described.

13. The combination of a motor having means connecting it with current-supply mains, a body of resistance and a series of automatic switches having means continually tending to maintain them in a closed position, the coils of said switches being connected across the armature-terminals of the motor, substantially as described.

14. The combination of a motor, a body of resistance, a switch in shunt to said resistance for connecting the motor to supply-mains independently of the same, a series of automatic switches having means tending to keep them closed and connected to short-circuit portions of said resistance when in such closed position, and actuating-coils for holding the switches in their open position, said switches being adjusted to close when different voltages are applied to their coils, substantially as described.

15. The combination of a motor, two bodies of resistance connected with the motor in series with current-supply mains, two series of switches for respectively short-circuiting portions of the respective bodies of resistance, certain of the switches having means continually acting to maintain them closed and others having means continually acting to hold them open, with actuating-coils for the switches placed to act against said means, the coils of certain of said switches being connected across the terminals of the motor-armature, substantially as described.

16. The combination of a motor, a body of resistance, a switch or switches for controlling the placing of said resistance in circuit with said motor, said switch or switches each having a plurality of actuating-coils with a controller having means for connecting certain of said coils to a source of current, said means being disconnected from said source when the motor has begun to generate an electromotive force, substantially as described.

17. The combination of a motor having means for connecting it with current-supply mains, means for connecting said motor in a circuit independent of said mains and means including a plurality of switches having independent actuating means for automatically causing a step-by-step variation of the current-flow through said motor after its armature has been disconnected from said supply-mains, substantially as described.

18. The combination of a motor having means for connecting it with current-supply mains, means for connecting said motor in a circuit independent of said mains, with means including a plurality of switches having independent actuating means for automatically maintaining the flow of current through the armature above a predetermined amount above zero, for a predetermined time after it has been disconnected from the supply-mains, substantially as described.

19. A system including an electric motor and apparatus for controlling the current-flow thereto, said apparatus including a plurality of automatic switches having independent actuating means and provided with a bar rigidly connecting their movable elements in such manner that said switches are either both open or both closed simultaneously, substantially as described.

In testimony whereof I have signed my name to this specification in the presence of two subscribing witnesses.

ARTHUR C. EASTWOOD.

Witnesses:
J. E. WELLMAN,
C. W. COMSTOCK.